G. P. SMITH.
Wagon Brake.
No. 71,802.
Patented Dec. 3, 1867.
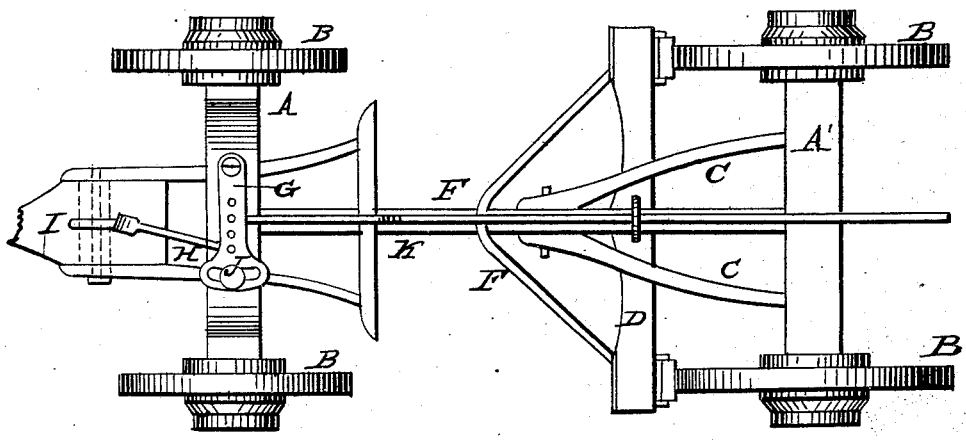

UNITED STATES PATENT OFFICE.

GEORGE P. SMITH AND JOHN DESSO, OF LAKE CITY, MINNESOTA.

IMPROVEMENT IN WAGON-BRAKE.

Specification forming part of Letters Patent No. 71,802, dated December 3, 1867.

*To all whom it may concern:*

Be it known that we, GEORGE P. SMITH and JOHN DESSO, of Lake City, in the county of Wabasha, and in the State of Minnesota, have invented certain new and useful Improvements in Wagon-Brakes; and do hereby declare that the following is a full, clear, and exact description thereof, reference being had to the accompanying drawings, and to the letters of reference marked thereon.

In the annexed drawings, making part of this specification, A A' represent the two axles of the wagon, and B B the wheels, upon which the axles are supported. K represents the coupling or perch-pole of the wagon, and C C the hind hounds. Lying across the hounds C is a brake-bar, D, which has a brake-block adjustably attached to each end.

E represents a rod, which has its two ends made fast to the front side of the brake-bar, near its ends, its center being secured to a bar or rod, F, which lies under and runs with the perch-pole, being connected or held beneath it by suitable loops. The forward end of this rod F hooks into a bar, G, which lies beneath, with one end pivoted to the axle A.

The bar G has a curved slot in one end, and through this slot passes a headed bolt, J, and then into the axle. By means of this slot one end of the bar G is allowed to partially revolve upon its pivot, moving backward and forward a distance of several inches.

The tongue I is so arranged that it has an endwise movement between the forward ends of the front hounds.

H represents a rod, which connects the rear end of the tongue to the bar G.

It will readily be seen that in going downhill with this wagon, when the wagon pushes forward, and the horses by holding back cause the tongue to slide endwise backward, the rod H, moving the bar G, causes the bar or rod F, through rod E, to move the brake-bar D back, so that its blocks strike the hind wheels. When the horses pull the tongue forward again they relieve the wheels from the pressure of the blocks by inverse means to which it was applied. It will thus be seen that in holding back the brakes are applied automatically, and that they are relieved in like manner.

I am aware that it is not new to connect the brake-bar generally to the tongue, so that the brakes will be applied to the wheels when the horses hold back; hence I do not claim this; but What I do claim as new, and desire to secure by Letters Patent, is—

The bar G, pivoted to the under side of the front axle, and provided with a slot for the bolt J and a series of holes through which the bars or rods H and F connect with it for operating the brake-blocks through their bar D, as and for the purpose set forth.

In testimony that we claim the foregoing we have hereunto set our hands this 19th day of August, 1867.

GEO. P. SMITH.
JOHN DESSO.

Witnesses:
CHAS. A. WOOD,
C. W. HACKETT,